(12) United States Patent
Zhang et al.

(10) Patent No.: US 10,274,771 B2
(45) Date of Patent: Apr. 30, 2019

(54) TOUCH DISPLAY SCREEN

(71) Applicant: Huawei Technologies Co., Ltd., Shenzhen (CN)

(72) Inventors: Bin Zhang, Shenzhen (CN); Menglong Zhao, Shenzhen (CN); Guangsheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/557,366

(22) PCT Filed: Dec. 8, 2015

(86) PCT No.: PCT/CN2015/096683
§ 371 (c)(1),
(2) Date: Sep. 11, 2017

(87) PCT Pub. No.: WO2017/096529
PCT Pub. Date: Jun. 15, 2017

(65) Prior Publication Data
US 2018/0246358 A1    Aug. 30, 2018

(51) Int. Cl.
*G02F 1/1333*    (2006.01)
*G06F 3/041*    (2006.01)

(52) U.S. Cl.
CPC .... *G02F 1/13338* (2013.01); *G02F 1/133308* (2013.01); *G06F 3/0412* (2013.01);
(Continued)

(58) Field of Classification Search
CPC .................................................. H01L 29/41733
(Continued)

(56) References Cited

U.S. PATENT DOCUMENTS

2001/0020985 A1    9/2001    Hinata
2002/0154254 A1*   10/2002   Tasaki ............... G02F 1/133308
                                                   349/58
(Continued)

FOREIGN PATENT DOCUMENTS

CN    200983051 Y    11/2007
CN    203933718 U    11/2014
(Continued)

OTHER PUBLICATIONS

Machine Translation and Abstract of Chinese Publication No. CN104220965, Dec. 17, 2014, 60 pages.
(Continued)

*Primary Examiner* — Aneeta Yodichkas
*Assistant Examiner* — Deeprose Subedi
(74) *Attorney, Agent, or Firm* — Conley Rose, P.C.

(57)    ABSTRACT

A touch display screen applied to an electronic device, and the touch display screen includes a touch component, a buffer layer, and a display component, where the touch component includes a first surface and a second surface opposite to the first surface; the buffer layer is made of a transparent elastic material, is filled between the touch component and the display component, and includes a third surface and a fourth surface opposite to the third surface, and the third surface is disposed opposite to the second surface; and the display component includes a display surface and a backlight surface opposite to the display surface, and the display surface is disposed opposite to the fourth surface.

20 Claims, 3 Drawing Sheets

(52) U.S. Cl.
    CPC ............ *G02F 2001/133331* (2013.01); *G02F 2201/503* (2013.01)

(58) Field of Classification Search
    USPC ............ 257/61, E29.117, E29.147, E29.151
    See application file for complete search history.

(56) References Cited

U.S. PATENT DOCUMENTS

| | | | |
|---|---|---|---|
| 2009/0087655 A1 | 4/2009 | Yamada et al. | |
| 2012/0092274 A1* | 4/2012 | Kim .................. | G06F 3/045 345/173 |
| 2013/0202715 A1* | 8/2013 | Wang .................. | C03C 3/095 424/618 |
| 2014/0022156 A1* | 1/2014 | Han .................. | G09G 3/3648 345/102 |
| 2014/0202916 A1* | 7/2014 | Kanda .................. | A45C 11/00 206/524.3 |
| 2014/0295150 A1 | 10/2014 | Bower et al. | |
| 2015/0070309 A1 | 3/2015 | Kang | |
| 2016/0246396 A1* | 8/2016 | Dickinson .......... | G06F 3/03545 |
| 2017/0049000 A1* | 2/2017 | Kang .................. | A45C 11/00 |
| 2017/0300140 A1* | 10/2017 | Chen .................. | G06F 3/041 |

FOREIGN PATENT DOCUMENTS

| | | |
|---|---|---|
| CN | 104220965 A | 12/2014 |
| CN | 204795193 U | 11/2015 |
| CN | 204808265 U | 11/2015 |
| EP | 2180367 A1 | 4/2010 |
| JP | 2002287119 A | 10/2002 |
| JP | 2013109766 A | 6/2013 |
| JP | 2013232239 A | 11/2013 |
| JP | 2015053055 A | 3/2015 |
| KR | 101333384 B1 | 11/2013 |
| WO | 9822867 A1 | 5/1998 |
| WO | 2006123616 A1 | 11/2006 |
| WO | 2013111672 A1 | 8/2013 |

OTHER PUBLICATIONS

Foreign Communication from a Counterpart Application, European Application No. 15910004.9, Extended European Search Report dated Mar. 20, 2018, 9 pages.
Machine Translation and Abstract of Chinese Publication No. CN200983051, Nov. 28, 2007, 4 pages.
Machine Translation and Abstract of Chinese Publication No. CN203933718, Nov. 5, 2014, 7 pages.
Machine Translation and Abstract of Chinese Publication No. CN204795193, Nov. 18, 2015, 4 pages.
Machine Translation and Abstract of Chinese Publication No. CN204808265, Nov. 25, 2015, 9 pages.
Machine Translation and Abstract of Korean Publication No. KR101333384, Nov. 28, 2013, 12 pages.
Foreign Communication from a Counterpart Application, PCT Application No. PCT/CN2015/096683, English Translation of International Search Report dated Aug. 31, 2016, 3 pages.
Machine Translation and Abstract of Japanese Publication No. JP2002287119, Oct. 3, 2002, 19 pages.
Machine Translation and Abstract of Japanese Publication No. JP2013109766, Jun. 6, 2013, 24 pages.
Machine Translation and Abstract of Japanese Publication No. JP2013232239, Nov. 14, 2013, 27 pages.
Machine Translation and Abstract of International Publication No. WO2013111672, Aug. 1, 2013, 59 pages.
Foreign Communication from a Counterpart Application, Japanese Application No. 2017-552434, Japanese Office Action dated Sep. 18, 2018, 5 pages.
Foreign Communication from a Counterpart Application, Japanese Application No. 2017-552434, English Translation of Japanese Office Action dated Sep. 18, 2018, 5 pages.

* cited by examiner

TOUCH DISPLAY SCREEN

CROSS-REFERENCE TO RELATED APPLICATIONS

This application is a national stage application of International Patent Application No. PCT/CN2015/096683, filed on Dec. 8, 2015, which is herein incorporated by reference in its entirety.

TECHNICAL FIELD

The disclosure relates to the field of electronic display screens, and in particular, to a touch display screen.

BACKGROUND

A touch display screen is a new human-machine interaction device. When a user touches the touch display screen by using a finger or another object, the touch display screen may respond to an operation of the user under control of a processor, so as to implement input and output functions. The touch display screen can be operated easily, conveniently, and quickly.

Currently, the touch display screen includes a touch module and a display module. The touch module is laminated to a display surface of the display module. The touch module is usually a sheet made of a material such as a sapphire or a reinforced glass.

However, because the touch component is a sheet made of a brittle material such as a sapphire or a reinforced glass, the touch component has low strength and easily splinters under impact of external force. This reduces a service life of the touch display screen.

SUMMARY

The disclosure provides a touch display screen applied to an electronic device, so as to improve impact-resistance performance of the touch display screen.

According to a first aspect, a touch display screen is provided, including a touch component, a buffer layer, and a display component, where the touch component includes a first surface and a second surface opposite to the first surface; the buffer layer is made of a transparent elastic material, is filled between the touch component and the display component, and includes a third surface and a fourth surface opposite to the third surface, and the third surface is disposed opposite to the second surface; and the display component includes a display surface and a backlight surface opposite to the display surface, and the display surface is disposed opposite to the fourth surface.

With reference to the first aspect, in a first possible implementation of the first aspect, the touch display screen further includes a sticky material layer, and two sides of the sticky material layer are respectively stuck to the second surface and the third surface, so that the touch component is laminated to the buffer layer.

With reference to the first aspect, in a second possible implementation of the first aspect, the touch display screen further includes a display screen frame, the display screen frame includes a groove, a frame, and a base, the frame is integrated on a top of the groove, and an inner edge of the frame has a same shape as an edge of the touch component; and when the touch component is embedded into the frame, the touch component, the frame, the groove, and the base form an airtight cavity, so as to package the display component and the buffer layer.

With reference to the second possible implementation of the first aspect, in a third possible implementation of the first aspect, the transparent elastic material is filled in a junction of the frame and the touch component.

With reference to the first aspect, in a fourth possible implementation of the first aspect, the touch display screen further includes a display screen frame, and the display screen frame includes a groove and a base; when the groove is fastened to the base, the groove and the base form an accommodation groove, and the accommodation groove is configured to accommodate the display component and the buffer layer; and the touch component has a same shape as a cross section of a top of the groove, and is fastened to the top of the groove.

With reference to the fourth possible implementation of the first aspect, in a fifth possible implementation of the first aspect, the transparent elastic material is filled in a junction of the groove and the buffer layer.

With reference to the fourth possible implementation of the first aspect, in a sixth possible implementation of the first aspect, the groove includes an upper groove and a lower groove; the lower groove is fastened to the base, and the lower groove has a same shape as the display component; and the upper groove has a same shape as the buffer layer, a height of the upper groove is the same as a thickness of the buffer layer, and a groove wall thickness of the upper groove is less than a groove wall thickness of the lower groove.

With reference to any one of the first aspect, or the possible implementations of the first aspect, in a seventh possible implementation of the first aspect, a material of the touch component is a sapphire, a ruby, or an aluminum-silicon reinforced glass.

With reference to any one of the first aspect, or the possible implementations of the first aspect, in a seventh possible implementation of the first aspect, the transparent elastic material includes at least one of polyethylene terephthalate (PET), polyvinyl chloride (PVC), polyethylene (PE), or polystyrene (PS).

With reference to any one of the first aspect, or the possible implementations of the first aspect, in a seventh possible implementation of the first aspect, the thickness of the buffer layer is 0.5 millimeter (mm) to 2 mm.

It may be learned from the foregoing technical solutions that the disclosure has the following advantages:

The touch display screen provided in the disclosure includes a touch component, a buffer layer, and a display component. The buffer layer is made of a transparent elastic material and is filled between the touch component and the display component. In the disclosure, impact-resistance performance of the touch display screen may be improved based on elasticity of the buffer layer.

DESCRIPTION OF EMBODIMENTS

The following clearly and completely describes the technical solutions in the embodiments of the disclosure with reference to the accompanying drawings in the embodiments of the disclosure. The described embodiments are merely some but not all of the embodiments of the disclosure. All other embodiments obtained by persons skilled in the art based on the embodiments of the disclosure without creative efforts shall fall within the protection scope of the disclosure.

Figure 1:
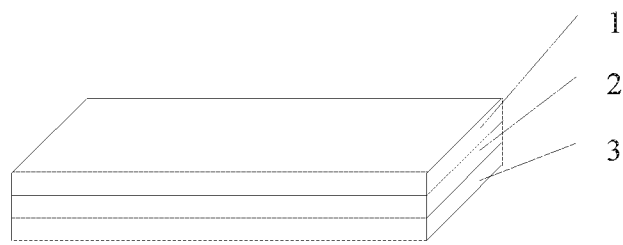
FIG. 1 is a schematic diagram of a touch display screen according to an embodiment of the disclosure.

Referring to FIG. 1, a touch display screen provided in the disclosure includes a touch component 1, a buffer layer 2, and a display component 3.

Figure 2:
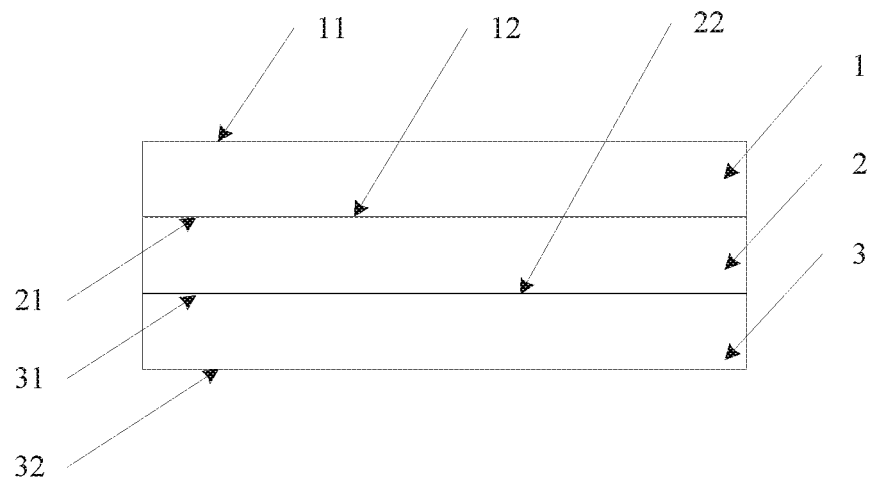
FIG. 2 is a schematic diagram of a cross section of a touch display screen according to an embodiment of the disclosure.

Each component of the touch display screen shown in FIG. 1 is described in detail below. Refer to FIG. 2.

The touch component 1 includes a first surface 11 and a second surface 12 opposite to the first surface 11.

The buffer layer 2 is made of a transparent elastic material, is filled between the touch component 1 and the display component 3, and includes a third surface 21 and a fourth surface 22 opposite to the third surface 21, and the third surface 21 is disposed opposite to the second surface 12.

The display component 3 includes a display surface 31 and a backlight surface 32 opposite to the display surface, and the display surface 31 is disposed opposite to the fourth surface 22.

A material of the touch component 1 is a sapphire, a ruby, or an aluminum-silicon reinforced glass. Preferably, a thickness of the touch component 1 is any value from 0.5 mm to 2 mm.

Preferably, a thickness of the buffer layer 2 is any value from 0.5 mm to 2 mm. A specific value is not limited herein. The transparent elastic material in the buffer layer 2 may be PET, PVC, PE, or PS, or may be another transparent elastic polymer, or a composite material made of the foregoing materials. This is not limited herein.

A process of buffering the buffer layer 2 under impact of external force is described below:

When pressure is applied to the first surface 11 of the touch component 1, the touch component 1 immediately transfers the pressure to the buffer layer 2. The transparent elastic material in the buffer layer 2 has low strength and immediately deforms under pressure, and generated elastic force can provide support for the touch component 1 and offload impact of the pressure on the touch component 1, so as to effectively protect the touch component 1. Therefore, the touch display screen provided in the disclosure has better impact-resistance performance than a touch display screen in the prior art.

Figure 3:
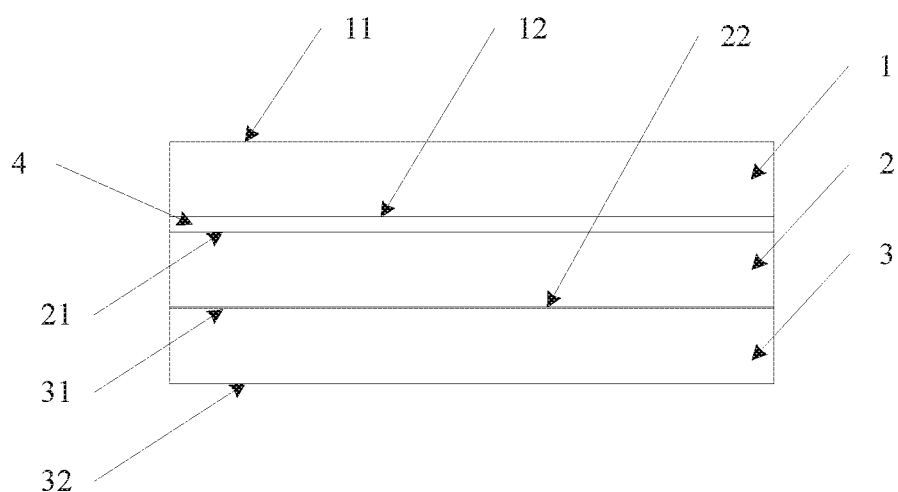
FIG. 3 is a schematic diagram of a cross section of a touch display screen provided with a sticky material layer according to an embodiment of the disclosure.

Optionally, in another embodiment of the disclosure, referring to FIG. 3, the touch display screen further includes a sticky material layer 4, and two sides of the sticky material layer 4 are respectively stuck to the second surface 12 and the third surface 21, so that the touch component 1 is laminated to the buffer layer 2.

The sticky material layer 4 is formed by solidifying a sticky material. The sticky material may firmly fasten the touch component 1 and the buffer layer 2 together. In addition, the sticky material has low strength and may deform under pressure, so as to reduce impact of pressure on the touch component 1, thereby improving an impact-resistance capability of the touch display screen. The sticky material may be an epoxy adhesive or a polyurethane adhesive, or may be another adhesive. This is not limited herein. A thickness of the sticky material layer is usually several micrometers, for example, 5 micrometer ($\mu$m). A specific value is not limited herein.

Figure 4:
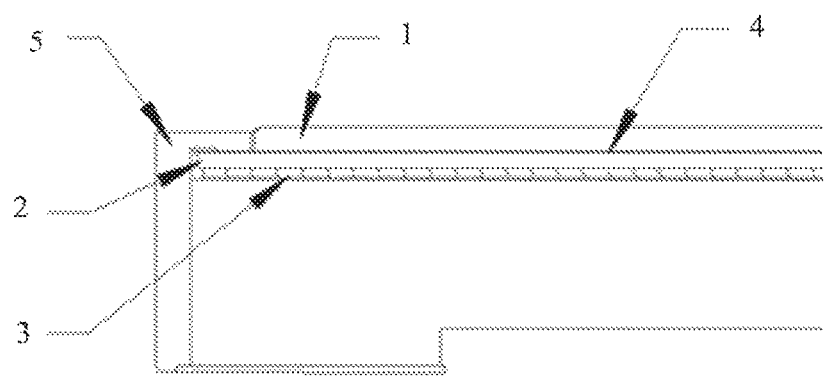
FIG. 4 is a schematic diagram of a side of a touch display screen with a display screen frame according to an embodiment of the disclosure.
Figure 5:
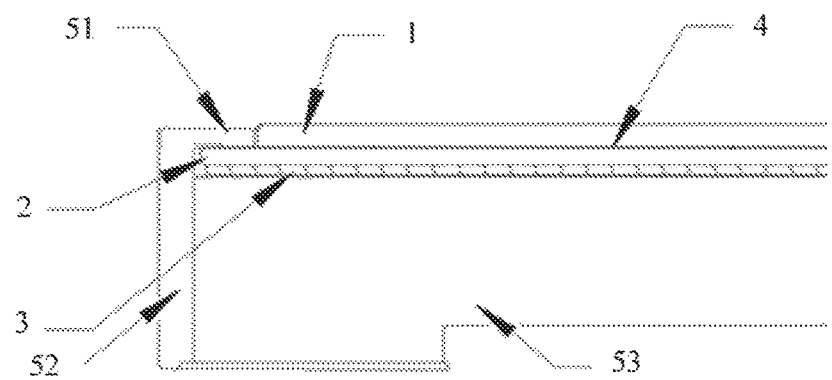
FIG. 5 is another schematic diagram of a side of a touch display screen with a display screen frame according to an embodiment of the disclosure.

In actual application, a touch display screen is usually provided with a display screen frame. A touch display screen fastened in the display screen frame is described below. Referring to FIG. 4, another touch display screen provided in the disclosure includes a touch component 1, a buffer layer 2, a display component 3, a sticky material layer 4, and a display screen frame 5.

Compositions and mutual connection relationships between the touch component 1, the buffer layer 2, the display component 3, and the sticky material layer 4 are similar to those in the embodiment shown in FIG. 1 or FIG. 2, or those in the optional embodiment shown in FIG. 3. Details are not described herein again.

The display screen frame 5 is described in detail below. Referring to FIG. 4, the display screen frame 5 includes a groove 52, a frame 51, and a base 53. The frame 51 is integrated on a top of the groove 52, and an inner edge of the frame 51 has a same shape as an edge of the touch component 1.

When the touch component 1 is embedded into the frame 51, the touch component 1, the frame 51, the groove 52, and the base 53 form an airtight cavity, so as to package the display component 3 and the buffer layer 2.

The groove 52 is fastened to the base 53.

In this embodiment, a material of the display screen frame is usually polycarbonate (PC) or acrylonitrile-butadiene-styrene copolymer (ABS), has high hardness and strength, may protect the touch component 1 against impact of external force from a side or a bottom, and can effectively protect the touch display screen.

It should be noted that in actual application, if the touch display screen does not need a sticky material to fasten the touch component 1 and the buffer layer 2, there may be no sticky material layer 4. This is not limited herein.

Further, a transparent elastic material is filled in a junction of the frame 51 and the touch component 1.

The transparent elastic material is filled between the inner edge of the frame 51 and an edge of the touch component 1. When pressure is applied to the groove 52 or the frame 51, the transparent elastic material may offload impact of pressure on the touch component 1 from a side, thereby effectively protecting the touch display screen. The transparent elastic material is the same as the transparent elastic material shown in the embodiment shown in FIG. 2. Details are not described herein again.

Figure 6:
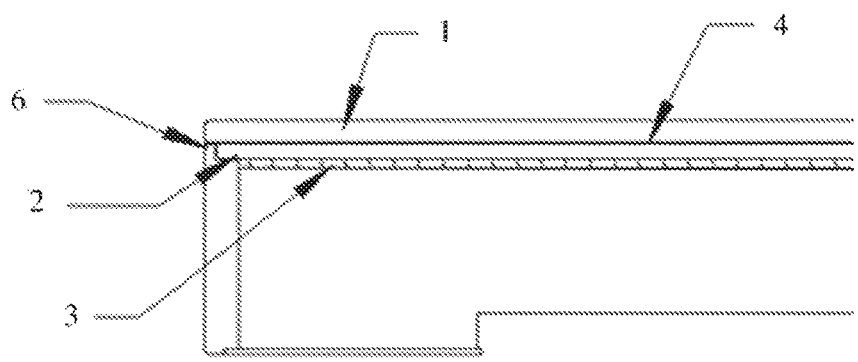
FIG. 6 is another schematic diagram of a side of a touch display screen with a display screen frame according to an embodiment of the disclosure.

Another touch display screen fastened in a display screen frame is described below. Referring to FIG. 6, the another touch display screen provided in the disclosure includes a touch component 1, a buffer layer 2, a display component 3, a sticky material layer 4, and a display screen frame 6.

Compositions and mutual connection relationships between the touch component 1, the buffer layer 2, the display component 3, and the sticky material layer 4 are similar to those in the embodiment shown in FIG. 1 or FIG. 2, or those in the optional embodiment shown in FIG. 3. Details are not described herein again.

Figure 7:
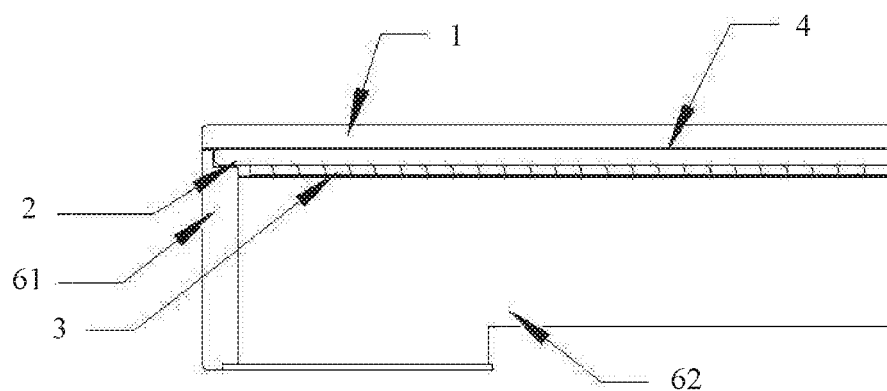
FIG. 7 is another schematic diagram of a side of a touch display screen with a display screen frame according to an embodiment of the disclosure.

The display screen frame 6 is described in detail below. Referring to FIG. 7, the display screen frame 6 includes a groove 61 and a base 62.

When the groove 61 is fastened to the base 62, the groove 61 and the base 62 form an accommodation groove, and the accommodation groove is configured to accommodate the display component 3 and the buffer layer 2. The touch component 1 has a same shape as a cross section of a top of the groove 61, and is fastened to the top of the groove 61.

Figure 8:
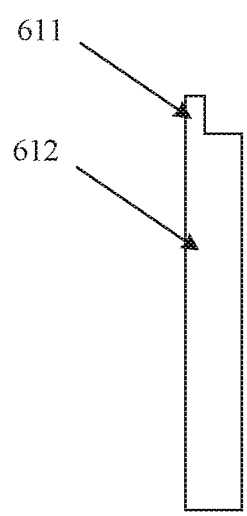
FIG. 8 is a schematic diagram of a side of a groove wall of a groove in a touch display screen according to an embodiment of the disclosure.

The groove 61 is described in detail below. Referring to FIG. 8, in another embodiment of the disclosure, the groove 61 includes an upper groove 611 and a lower groove 612.

The lower groove 612 is fastened to the base 62, and the lower groove 612 has a same shape as the display component 3.

The upper groove 611 has a same shape as the buffer layer 2, a height of the upper groove 611 is the same as a thickness of the buffer layer 2, and a groove wall thickness of the upper groove 611 is less than a groove wall thickness of the lower groove 612.

A groove wall height of the lower groove 612 is higher than a height of the base 62. When the lower groove 612 is fastened to the base 62, the accommodation groove is formed and may accommodate the display component 3.

Because the groove wall thickness of the upper groove 611 is less than the groove wall thickness of the lower groove 612, a top of the lower groove 612 forms an annular support platform at the bottom of the upper groove 611, so as to support the buffer layer 2.

In another embodiment of the disclosure, a transparent elastic material is filled in a junction of the groove 61 and the buffer layer 2.

The transparent elastic material is filled between a groove wall of the upper groove 611 and an edge of the buffer layer 2. When pressure is applied to the groove 61, the transparent elastic material may offload impact of pressure on the touch component 1 from a side, thereby effectively protecting the touch display screen. For the transparent elastic material, reference may be made to the transparent elastic material in the embodiment shown in FIG. 2. Details are not described herein again.

The foregoing embodiments are merely intended for describing the technical solutions of the disclosure, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A touch display for an electronic device, comprising:
   a touch component comprising:
      a first surface;
      a second surface opposite the first surface; and
      a first transverse edge connected to the first surface and the second surface;
   a buffer layer made of a first transparent elastic material, the buffer layer comprising:
      a third surface;
      a fourth surface opposite the third surface; and
      a second transverse edge connected to both of the third surface and the fourth surface, the third surface adjoining the second surface;
   a display component comprising:
      a display surface;
      a backlight surface opposite the display surface; and
      a third transverse edge connected to both of the display surface and the backlight surface, the buffer layer being filled between the touch component and the display component, and the display surface being disposed opposite the fourth surface; and
   a display screen frame comprising a frame, the frame being parallel to the touch component and comprising an inner transverse edge adjacent the first transverse edge of the touch component, the inner transverse edge being coupled to the first transverse edge using a second transparent elastic material filled between the inner transverse edge and the first transverse edge, the second transparent elastic material being configured to deflect pressure from an external force to the frame away from the first transverse edge of the touch component.

2. The touch display of claim 1, further comprising an adhesive layer, each opposed side of the adhesive layer being coupled to respective surfaces of the second surface and the third surface so as to laminate the touch component to the buffer layer.

3. The touch display of claim 1, wherein the display screen frame further comprises a groove and a base, the frame being integrated on a top of the groove, the inner transverse edge of the frame comprising a same shape as the first transverse edge of the touch component, the touch component, the frame, the groove, and the base together forming an airtight cavity, and the touch component being embedded into the frame so as to package the display component and the buffer layer.

4. The touch display of claim 1, wherein the display screen frame further comprises a groove and a base, the groove forming an accommodation groove between the groove and the base when coupling the groove to the base, the accommodation groove being configured to accommodate the display component and the buffer layer, the touch component having a same shape as a cross section of a top of the groove, and the touch component being fastened to the top of the groove.

5. The touch display of claim 4, wherein the second transparent elastic material is filled in a junction between the groove and the buffer layer.

6. The touch display of claim 4, wherein the groove comprises an upper groove and a lower groove, the lower groove receiving the base and having a shape as the display component, the upper groove having a shape as the buffer layer, a height of the upper groove being a same dimension as a thickness of the buffer layer, and a first groove wall thickness of the upper groove being less than a second groove wall thickness of the lower groove.

7. The touch display of claim 1, wherein a material of the touch component is sapphire.

8. The touch display of claim 1, wherein either the first or the second transparent elastic material is polyethylene terephthalate.

9. The touch display of claim 6, wherein the thickness of the buffer layer is about 0.5 millimeter to 2 millimeter.

10. The touch display of claim 1, wherein a material of the touch component is ruby.

11. The touch display of claim 1, wherein a material of the touch component is aluminum-silicon reinforced glass.

12. The touch display of claim 1, wherein either the first or the second transparent elastic material is polyvinyl chloride.

13. The touch display of claim 1, wherein either the first or the second transparent elastic material is polyethylene.

14. The touch display of claim 1, wherein either the first or the second transparent elastic material is polystyrene.

15. A method of protecting a touch display from an external force, comprising:
   providing the touch display, comprising
      a touch component comprising:
         a first surface;
         a second surface directly opposite the first surface; and
         a first transverse edge connected to the first surface and the second surface;
      a buffer layer of a first transparent elastic material coupled to the touch component; and
      a display screen frame comprising a frame, the frame being parallel to the touch component and comprising an inner transverse edge adjacent the first transverse edge of the touch component, the inner transverse edge being coupled to the first transverse edge using a second transparent elastic material filled between the inner transverse edge and the first transverse edge;
   receiving a first pressure corresponding to a first external force to the first surface of the touch component;
   receiving a second pressure corresponding to a second external force to the display screen frame;
   transferring the first pressure to the buffer layer in response to receiving the first pressure to the first surface of the touch component;
   deforming the buffer layer in response to transferring the first pressure to the buffer layer so as to deflect the first pressure away from the touch component; and
   transferring, by the second transparent elastic material, the second pressure away from the first transverse edge of the touch component so as to deflect the second pressure from the second external force to the frame away from the first transverse edge of the touch component.

16. The method of claim 15, wherein the display screen frame further comprises a groove, and a base, the frame being integrated on a top of the groove, the inner transverse edge of the frame comprising a same shape as the first transverse edge of the touch component, the touch component, the frame, the groove, and the base together forming an airtight cavity, and the touch component being embedded into the frame.

17. The method of claim 15, wherein a material of the touch component is ruby.

18. The method of claim 15, wherein a material of the touch component is aluminum-silicon reinforced glass.

19. The method of claim 15, wherein the first or the second transparent elastic material is one of polyvinyl chloride, polyethylene, or polystyrene.

20. The method of claim 15, wherein either the first or the second transparent elastic material is polyethylene terephthalate.

* * * * *